Dec. 16, 1941.   T. C. DELAVAL-CROW   2,266,175
BEARING AND SEAL THEREFOR
Filed Aug. 27, 1938
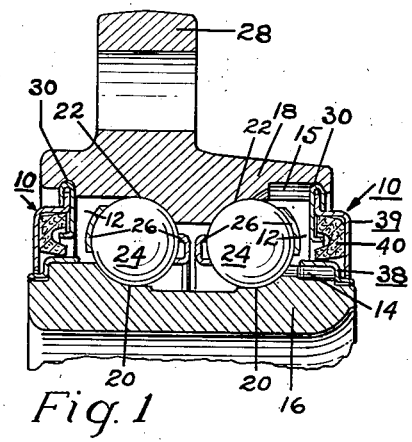
Fig. 1
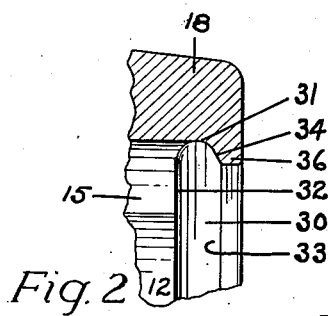
Fig. 2
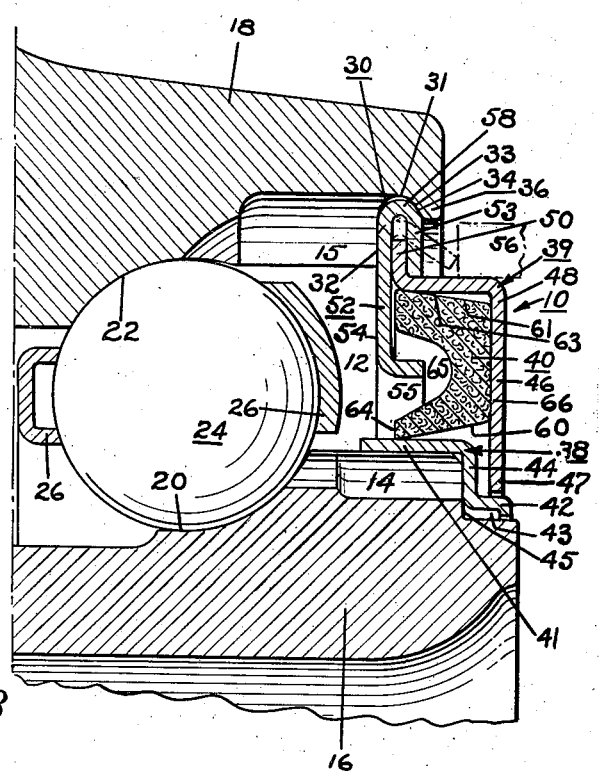
Fig. 3
Fig. 4
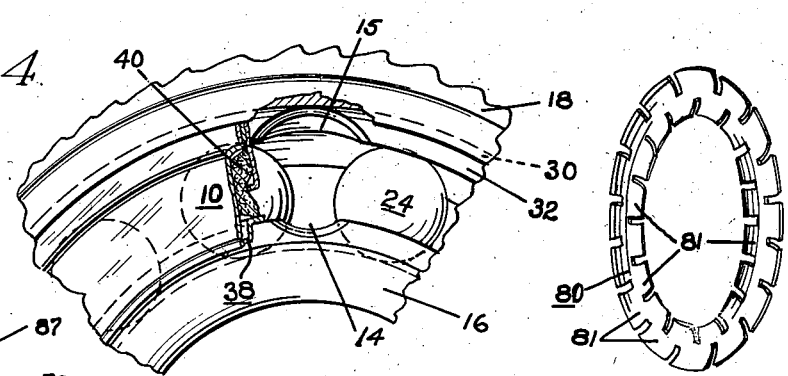
Fig. 5
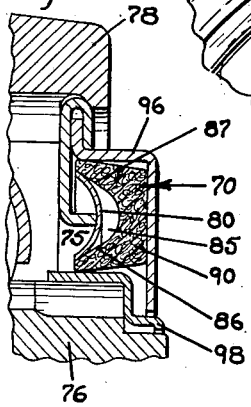
Fig. 6
Inventor:
THOMAS C. DELAVAL-CROW,
by
his Attorney.

Patented Dec. 16, 1941

2,266,175

UNITED STATES PATENT OFFICE 2,266,175

BEARING AND SEAL THEREFOR

Thomas C. Delaval-Crow, Bristol, Conn., assignor to General Motors Corporation, Detroit, Mich., a corporation of Delaware Application August 27, 1938, Serial No. 227,185

5 Claims. (Cl. 308—187.2)

This invention relates to bearings and particularly to a bearing seal that maintains a lubricant within the bearing and which prevents water and other deleterious substances from entering the bearing.

An object is to provide an improved sealing device in unit-handling relation with a pair of relatively rotatable members, such as the race rings of an antifriction bearing. Another object is to provide an easily constructed, inexpensive sealing device which is particularly adapted for sealing the space between the ball races of a bearing having filling slots for inserting the balls in the bearing. A still further object is to provide a yieldable bearing seal which will resiliently maintain a sealing relation even under conditions of misalignment of bearing parts, and which also utilizes capillary attraction to maintain a lubricant within the bearing.

To these ends, and also to improve generally upon devices of the character indicated, my invention consists in the various matters hereinafter described and claimed.

In the accompanying drawing:

Figure 1 is a fragmentary view in axial section showing a ball bearing equipped with my seal;

Figure 2 is an enlarged fragmentary sectional view of the outer race ring and showing the relation of a ball filling groove to the seal supporting groove;

Figure 3 is an enlarged sectional view of the right-hand side of Figure 1;

Figure 4 is a fragmentary side elevation of Figure 1 with the parts broken away to show their construction;

Figure 5 is a fragmentary sectional view of another embodiment; and

Figure 6 is a perspective view of one type of a spring ring for use with the structure of Figure 5.

Generally stated, my sealing device 10, which is applicable for sealing the annular space between any two relatively rotatable members, is particularly adapted for sealing an end of the annular lubricant chamber 12 of a ball bearing provided with the ball loading slots 14 and 15 respectively located in the inner and the outer race rings 16 and 18.

In the embodiment illustrated in Figures 1, 3, and 4, I have provided the similar sealing devices 10 in unit-handling relation with each end of a double row antifriction bearing having the inner and outer race rings 16 and 18 respectively provided with the angular contact raceways 20 and 22 engaged by rolling elements such as the balls 24 guided by the cages 26. The outer race ring 18 has a flanged portion 28 which may be bolted or otherwise secured to a wheel or other member not shown. Each end of the outer race ring 18 has an internally and peripherally disposed seal-holding groove 30 provided with an arcuate bottom wall 31 merging into the divergent side walls 32 and 33, the inner side wall 32 being preferably perpendicular to the axis of the bearing rotation and the outer conical side wall 33 having its elements at approximately a sixty degree angle with the axis of the bearing. The cooperating ball filling slots 14 and 15 respectively communicate at their inner ends with the raceways 20 and 22. The groove 30 at the right as viewed in Figures 1, 2 and 3 cuts transversely through the filling slot 15 with the bottom of the arcuate wall 31 passing through and preferably merging with the bottom of the slot 15, and with its outer side wall 33 forming the inner end face 34 of an arcuate lip 36 at the outer end of this filling slot, so that a shield or seal mounted in this holding groove 30 will lie in complete sealing relation with the outer race ring 18.

Each of my sealing devices 10 includes a stepped sleeve 38 pressed over the end of the inner race ring 16 and a two part casing or housing 39 which is mounted in the holding groove 30 and carries the sealing member 40 in yieldable sealing contact with the cylindrical sleeve portion 41 that overlies the filling slot 14. The sleeve portion 41 is connected to the reduced cylindrical sleeve portion 42, received within the peripheral race ring recess 43, by an annular shoulder 44 which abuts the race ring shoulder 45 and closes the outer end of the filling slot 14. The casing 39, which is supported in the groove 30 and closes the outer end of the filling slot 15, has an outer ring 46 provided with an annular wall 47 extending into the stepped portion of the sleeve 38 in closely spaced relation to the reduced ring portion 42, and an intermediate cupped portion 48 of the ring 46 has the outwardly disposed peripheral flange 50 clamped within the laterally bent-over rim 53 of the inner casing ring 52 which has a flat annular wall 54 that fits against the side wall 32 and terminates in a flange 55 directed into the cupped portion 48. After the sealing member 40 is mounted in the cupped portion 48, the rim 53 is initially bent over to the dot-dash indicated position of Figure 3 to secure the casing parts and the sealing member in unit-handling relation. The casing assembly is then entered into the outer race ring 18 and a suitable tool 56 further bends the rim 53 into the full line clamped position shown and forces the rounded peripheral bead 58 outwardly into seating engagement within the holding groove 30 in the same general manner as disclosed in the Patent Number 1,917,987 issued to Large on July 11, 1933. As shown in Figure 3, the rounded bead 58 wedges in tight sealing engagement between the divergent groove walls 32 and 33 without seating in the bottom of the groove 30 so that the radial component of thrust is minimized and the sealing device does not tend to diametrically distort the outer race ring 18.

The yieldable sealing member 40, which is nonmetallic, is preferably a moulded resilient material which may be composed of asbestos and a binder such as the commercial packing known under the trade name "Garlock." This sealing member 40, which loosely fits between the annular casing walls 47 and 52, has the inner and outer peripheral walls 60 and 61 angularly and resiliently contacting the cylindrical ring portion 41 and the peripheral wall 63 of the ring 46 in yieldable capillary sealing engagement. The inner wall 64 of the sealing member 40 has the intermediate annular recess 65 which loosely receives the flange 55 and facilitates a yieldable sealing contact of the sealing member 40 even in the event that the race rings become non-concentrically located. The outer wall 66 of the sealing member 40 normally fits against the wall 47 and guides the sealing member so that the desired capillary angles are maintained.

Figure 5 shows a slightly different embodiment of my invention wherein the sealing device 70, which generally corresponds in structure to my sealing device 10, is mounted between the inner and the outer race rings 76 and 78 in the same manner as previously described. However, in this embodiment the inwardly directing annular flange 75 presses against the intermediate annular zone of a convexly curved spring ring 80 received in the annular recess 85 of the sealing member 90 and having its inner and outer peripheries resiliently engaging the walls 86 and 87 of the recess 85 so that the sealing member 90 is resiliently expanded into yieldable capillary sealing engagement with both the casing ring 96 and the stepped sleeve 98. The spring ring 80 may, if desired, also be transversely cut with a series of spaced slots to provide the outwardly and inwardly disposed spring fingers 81 as shown in Figure 6. It will be understood, of course, that the spring ring is yieldably resilient and it is transversely deformed to a curvature of lesser radius when it is mounted in the assembled position shown in Figure 5.

I claim:

1. In a bearing, a pair of annularly spaced race rings each of which is provided with a filling slot having an open outer end, a sleeve on one of said rings and closing the outer end of one of the slots, an annular holder secured to the other race ring and closing the outer end of said other slot, and a yieldable sealing ring carried by the holder in resilient sealing contact with the sleeve and making a capillary angle with said sleeve; substantially as described.

2. In a bearing, a pair of annularly spaced race rings respectively provided with a filling slot, one of said rings having a peripheral groove transversely cutting across one of said slots, a lip at the outer end of the groove engaged slot and partially closing said slot, a side of the lip coinciding with a side of the groove, a holder wedged in said groove and closing the groove engaged slot, a sleeve on said other ring and closing the other slot, and a yieldable annular seal carried by the holder in capillary sealing relation with the holder and with said sleeve; substantially as described.

3. In a bearing, a pair of annularly spaced race rings each of which is provided with a filling slot having an open outer end, one of said rings having a peripheral groove transversely cutting across one of the slots, an annular casing wedged in the groove and closing said last mentioned slot, a sleeve on the other ring and overlying said other slot, a peripheral stepped portion on the sleeve closing the end of said other slot, a wall on the casing extending into the stepped portion, and a yieldable annular sealing number carried by the casing and sealingly contacting said sleeve; substantially as described.

4. In an antifriction bearing, a pair of relatively rotatable race rings each of which has a filling slot, a sleeve on one of said rings overlying the slot therein and having a wall closing the end of said slot, a seal holder secured to the other race ring, and an annular sealing member carried by the holder and in peripheral sealing engagement with said sleeve.

5. In an antifriction bearing, a pair of relatively rotatable race rings one of which has a filling slot, a sleeve on one of said rings overlying the slot therein and having a wall closing the end of said slot, and a sealing device secured to the other race ring and in annular sealing engagement with said sleeve.

THOMAS C. DELAVAL-CROW.